United States Patent
Op't Roodt et al.

(10) Patent No.: US 9,399,446 B2
(45) Date of Patent: Jul. 26, 2016

(54) WIPER BLADE

(71) Applicant: Robert Bosch GmbH, Stuttgart (DE)

(72) Inventors: Inigo Op't Roodt, Hasselt (BE); Peter De Block, Halen (BE)

(73) Assignee: Robert Bosch GmbH, Stuttgart (DE)

( * ) Notice: Subject to any disclaimer, the term of this patent is extended or adjusted under 35 U.S.C. 154(b) by 186 days.

(21) Appl. No.: 14/291,871

(22) Filed: May 30, 2014

(65) Prior Publication Data

US 2014/0259506 A1 Sep. 18, 2014

Related U.S. Application Data

(60) Continuation of application No. 13/748,339, filed on Jan. 23, 2013, now Pat. No. 8,769,762, which is a division of application No. 12/867,280, filed as application No. PCT/EP2009/051888 on Feb. 18, 2009, now Pat. No. 8,381,350.

(30) Foreign Application Priority Data

Mar. 17, 2008 (DE) .......................... 10 2008 000 708

(51) Int. Cl.
*B60S 1/38* (2006.01)

(52) U.S. Cl.
CPC .................. *B60S 1/3874* (2013.01); *B60S 1/38* (2013.01); *B60S 1/3858* (2013.01); *B60S 1/3879* (2013.01);
(Continued)

(58) Field of Classification Search
CPC ........ B60S 1/38; B60S 1/3858; B60S 1/3865; B60S 1/3874; B60S 1/3879; B60S 1/3894; B60S 2001/3822; B60S 2001/3827

USPC ...................... 15/250.451, 250.452, 250.453, 15/250.454, 250.361, 250.43, 250.44
IPC .................................................. B60S 1/38,1/40
See application file for complete search history.

(56) References Cited

U.S. PATENT DOCUMENTS

| | | | | |
|---|---|---|---|---|
| 2,782,443 | A | * | 2/1957 | Krohm .................. B60S 1/3801 15/250.452 |
| 3,430,285 | A | * | 3/1969 | Rickett ..................... B60S 1/38 15/250.361 |

(Continued)

FOREIGN PATENT DOCUMENTS

| | | |
|---|---|---|
| CN | 2832607 | 11/2006 |
| CN | 1956867 | 5/2007 |

(Continued)

OTHER PUBLICATIONS

PCT/EP2009/051888 International Search Report dated May 4, 2009 (6 pages).

*Primary Examiner* — Joseph J Hail
*Assistant Examiner* — Marc Carlson
(74) *Attorney, Agent, or Firm* — Michael Best & Friedrich LLP

(57) ABSTRACT

A wiper blade with a wiper strip, in the lateral longitudinal grooves of which spring rails are inserted as springy supporting elements. The ends of the spring rails are connected with one another by a bridge in that side parts of the bridge are supported at the upper side of the spring rail and engage recesses of the spring rails, whereas a middle part of the bridge bridges a back strip of the wiper strip, which forms the upper boundary of the longitudinal grooves. It is proposed that the spring rails, at their front faces, have short slots, which extend in the longitudinal direction of the spring rails and which are engaged by the I-shaped angle pieces of the bridge. Lower legs of the angle pieces are directed towards the middle of the spring rails, gripping these from below.

10 Claims, 5 Drawing Sheets

(52) U.S. Cl.
CPC .............. *B60S 1/3894* (2013.01); *B60S 1/3865* (2013.01); *B60S 2001/3822* (2013.01); *B60S 2001/3827* (2013.01)

(56) References Cited

U.S. PATENT DOCUMENTS

| | | | | |
|---|---|---|---|---|
| 3,626,544 | A * | 12/1971 | Lopez et al. | B60S 1/38 15/250.361 |
| 5,926,907 | A | 7/1999 | Schmid et al. | |
| 6,055,697 | A | 5/2000 | Wollenschlaeger | |
| 6,253,412 | B1 * | 7/2001 | Herrmann | B60S 1/3801 15/250.454 |
| 6,836,927 | B2 * | 1/2005 | De Block | B60S 1/38 15/250.43 |
| 6,904,639 | B2 * | 6/2005 | Dietrich | B60S 1/38 15/250.43 |
| 7,581,280 | B2 | 9/2009 | Op't Roodt et al. | |
| 7,587,783 | B1 | 9/2009 | Lin | |
| 7,716,780 | B2 | 5/2010 | Scholl et al. | |
| 7,908,703 | B2 | 3/2011 | Van Bealen | |
| 2007/0011840 | A1 * | 1/2007 | Gilli | B60S 1/3889 15/250.352 |
| 2007/0240271 | A1 | 10/2007 | Wilms et al. | |
| 2007/0289082 | A1 * | 12/2007 | Herinckx | B60S 1/38 15/250.361 |
| 2008/0222829 | A1 * | 9/2008 | Chiang | B60S 1/386 15/250.32 |
| 2008/0222833 | A1 * | 9/2008 | Henin | B60S 1/38 15/250.201 |
| 2008/0235896 | A1 | 10/2008 | Cheng | |
| 2008/0289134 | A1 * | 11/2008 | Boussicot | B60S 1/381 15/250.32 |
| 2008/0295273 | A1 * | 12/2008 | Lin | B60S 1/381 15/250.452 |
| 2008/0313843 | A1 | 12/2008 | Chou | |
| 2009/0007364 | A1 | 1/2009 | Jarasson et al. | |
| 2009/0013492 | A1 | 1/2009 | Henin | |
| 2009/0064440 | A1 | 3/2009 | Boland | |
| 2009/0172910 | A1 | 7/2009 | De Block et al. | |
| 2010/0058552 | A1 | 3/2010 | Coos | |
| 2010/0242204 | A1 | 9/2010 | Chien | |
| 2011/0041280 | A1 | 2/2011 | Choi et al. | |
| 2011/0113581 | A1 | 5/2011 | Boland | |
| 2011/0126373 | A1 | 6/2011 | Ishida et al. | |

FOREIGN PATENT DOCUMENTS

| | | |
|---|---|---|
| DE | 10038397 | 3/2002 |
| DE | 202004012109 | 9/2004 |
| DE | 102004019158 | 11/2005 |
| EP | 1698533 | 9/2006 |
| RU | 2293670 | 2/2007 |
| WO | 2007/051669 | 5/2007 |
| WO | 2008/046690 | 4/2008 |

* cited by examiner

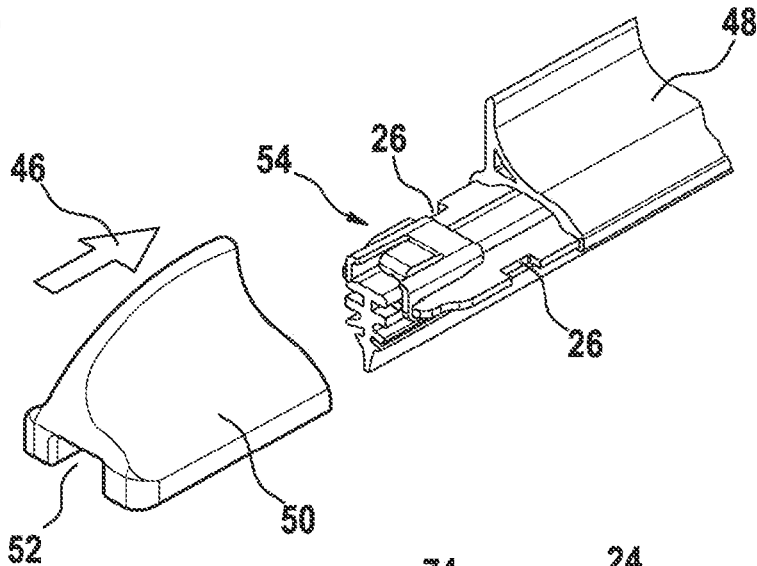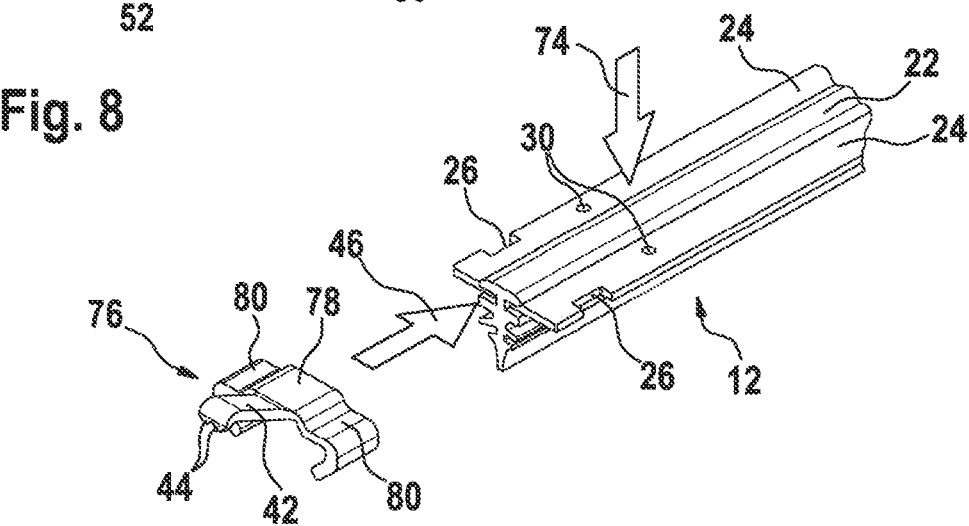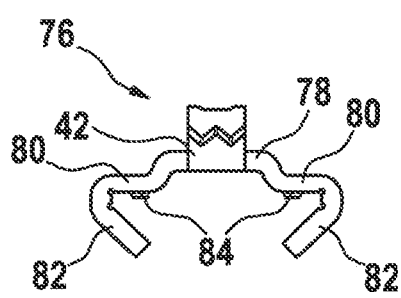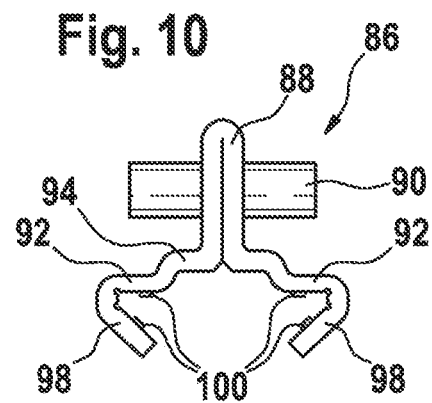

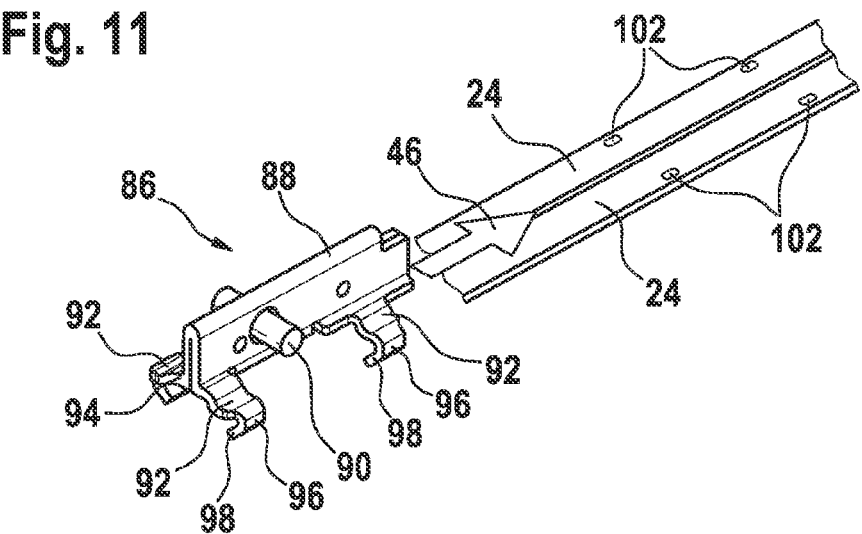
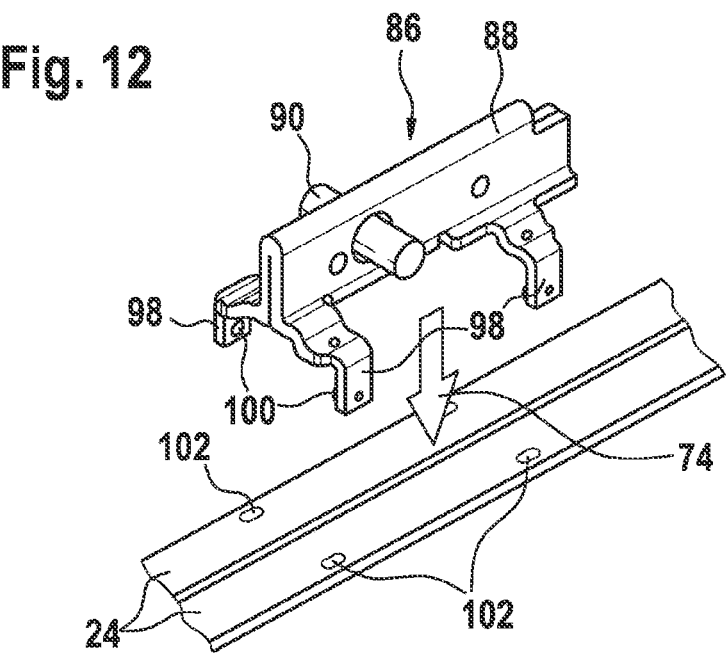

WIPER BLADE

RELATED APPLICATIONS

This application is continuation of pending U.S. application Ser. No. 13/748,339, filed Jan. 23, 2013, which is a divisional of U.S. application Ser. No. 12/867,280, filed Aug. 12, 2010, which is a U.S. 371 National Phase filing of PCT/EP2009/051888, filed Feb. 18, 2009, which claims priority to German Application No. 10 2008 000 708.0, filed Mar. 17, 2008. The entire contents of all of the foregoing are hereby incorporated by reference.

BACKGROUND OF THE INVENTION

The invention relates to a wiper blade.

DE 10 2005 052 258 A1 discloses a wiper blade of the type in question, in which the ends of two spring rails embedded in longitudinal grooves of a wiper strip are connected to each other by a bridge. The bridge has side parts which run parallel to the spring rails and are supported thereon while a central part of the bridge spans a back strip of the wiper strip. Holes are provided in the spring rails, in the region of the ends thereof, through which parts of the side parts reach and, on that side of the spring rails which faces away from the central part, are plastically deformed in such a manner that the bridge is connected fixedly to the spring rails. In this manner, the spring rails are at a constant distance to each other over the length thereof during operation, and therefore the head strip of the wiper strip is not wedged between the spring rails but rather can easily be matched to the curvature of a vehicle window. A tab is integrally formed on that end surface of the central part of the bridge which faces the center of the wiper blade and, at the end of said tab, at least one claw is angled toward the back strip and, in the fitted state, is pressed into the latter. As a result, the wiper strip is fixed in the longitudinal direction relative to the spring rails.

Furthermore, U.S. Pat. No. 3,192,551 discloses a wiper blade with a joining element for the articulated connection of the wiper blade to a wiper arm. The joining element is connected by means of rivets to a supporting element approximately in the center of said supporting element, which is designed as a spring rail.

SUMMARY OF THE INVENTION

According to the invention, the end sides of the spring rails have short slots which run in the longitudinal direction of the spring rails and in which l-shaped angle pieces of the bridge engage, while the lower limbs of the angle pieces are directed toward the center of the spring rails and grip the latter from below. In an advantageous manner, a tab can be integrally formed on the central part of the bridge and face the end of the spring rails, and said tab extends between the side parts of the bridge.

The bridge can be produced as a sheet-metal bent part with little consumption of material and can be fitted in a simple manner, in particular without welding and riveting processes. In this case, the side parts are angled by approximately 90 degrees with respect to the central part of the bridge such that said side parts are supported by the sheet-metal thickness on the spring rails, and the slot width corresponds to the sheet-metal thickness. As a result of the claws of the tab facing the end of the spring rails, a rectilinear end surface is produced on the opposite side, to which an end cap can be simply latched. This is particularly advantageous if the bridge is supported in the longitudinal direction not only on the back strip of the wiper strip via the claws and the tab on the back strip 22 but also, according to a refinement of the invention, is supported on the spring rails via hooks at the free ends of the lower limbs, the hooks engaging in corresponding bores in the spring rails in the fitted state. In this case, it may be expedient for the side parts to have cutouts on the sides which face the hooks, into which the hooks enter in the fitted state. This results in a highly stable form-fitting connection.

According to a refinement of the invention, the side parts of the bridge run with the wide sides thereof parallel to the spring rails. l-shaped angle pieces are integrally formed at the free ends of said side parts, the lower limbs of said angle pieces gripping the ends of the spring rails from below from the end sides, and, in the fitted state, bumps on those sides of the lower limbs and/or of the side parts which face the spring rails engaging in bores in the spring rails. Depending on the application, it may be sufficient to provide bumps only on the lower limbs or on the side parts. However, if the form-fitting connection is subjected to heavy loading, it is expedient to arrange bumps on both parts. It is also possible here for the end cap to latch on that end side of the bridge which faces the center. In order, however, to design the fixing of the bridge such that it is largely independent of the fixing of the end cap, it may be advantageous for the outer longitudinal sides of the spring rails to have cutouts to which the end cap latches in the fitted state.

According to a further refinement of the invention, claws which engage around the outer longitudinal sides of the spring rails are integrally formed on the longitudinal sides of the side parts, on the wide sides thereof which run parallel to the spring rails. In the region of the claws, bumps which engage in bores in the spring rails are provided on those sides of the side parts and/or of the claws which face the spring rails. What has been stated with regard to the previous exemplary embodiment is essentially also applicable here. The side parts together with the claws thereof can be matched in length to the requirements of the application. In general, they can be kept shorter than in the previous exemplary embodiment.

In order to keep the distance between the spring rails as constant as possible over the entire length of the wiper blade during operation, it is advantageous for a joining element for the articulated connection of the wiper blade to a wiper arm to have lateral claws which, in the fitted state, grip by means of the lower limbs thereof the spring rails from below from the outer longitudinal sides thereof. In the fitted state, bumps on those sides of the lower limbs and/or of the side parts of the joining element which face the spring rails engage in depressions or cutouts in the spring rails. As a result, the joining element is fixed relative to the spring rails in the longitudinal direction, and the spring rails are kept at a distance by the joining element.

BRIEF DESCRIPTION OF THE DRAWINGS

Further advantages emerge from the description below of the drawing. The drawings illustrates exemplary embodiments of the invention. The drawings, the description and the claims contain numerous features in combination. A person skilled in the art will expediently also consider the features individually and put them together to form meaningful further combinations.

In the drawings:

FIG. 7 shows a perspective partial view of a wiper blade with a spoiler and an end cap during installation, FIG. 8 shows a variant of FIG. 1, FIG. 9 shows an enlarged view of a bridge according to FIG. 8 in the installation direction, FIG. 10 shows a view of a joining element in the installation direction according to FIG. 11, FIG. 11 shows a perspective view of a joining element during installation in the longitudinal direction of the spring rails, and FIG. 12 shows a perspective view of a joining element during installation transversely with respect to the longitudinal direction of the spring rails.

DETAILED DESCRIPTION

Figure 1:
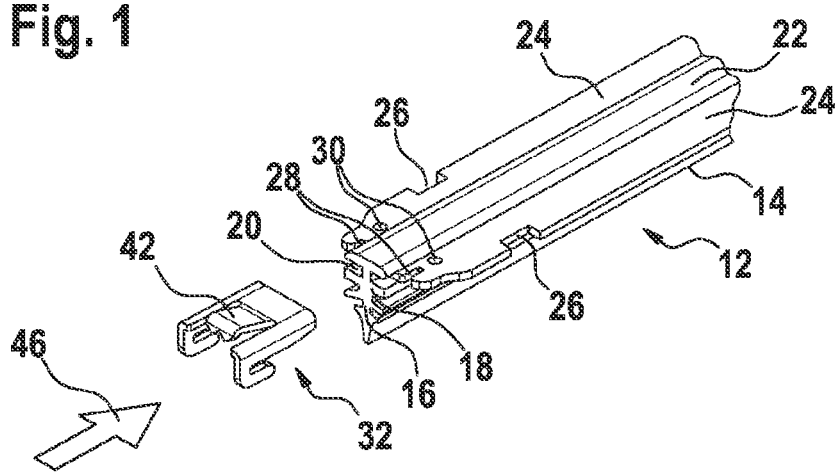
FIG. 1 shows a perspective partial view of a wiper strip with spring rails and a bridge during installation.

An essential component of a wiper blade 10 is the wiper strip 12 thereof which slides by means of a wiper lip 14 over a vehicle window (not illustrated) during a wiping movement. The wiper lip 14 is connected via a tilting web 16 to a head strip 18. The latter has longitudinal grooves 20 on both sides, which are upwardly bounded by a back strip 22 of the head strip 18. Spring rails 24 are inserted as a resiliently elastic supporting element into the longitudinal grooves 20 and protrude for a distance from the longitudinal grooves. A spoiler 48 and end caps 50 are guided on said part of the spring rails 24.

In the exemplary embodiment according to FIGS. 1 to 5, the spring rails 24 are connected to each other by a bridge 32. The latter is produced from a sheet-metal plate by punching and bending, two side parts 36 being angled approximately at right angles from a central part 34. A tab 42 is punched out between the side parts 36. The free end of said tab, on which two claws 44 are integrally formed, faces the end of the wiper blade 10. At the same end, the side parts 36 have angle pieces 38 which cross the spring rails 24 and fit into short slots 28 on the end sides of the spring rails 24. During installation, the bridge 32 is pushed in the installation direction 42 in the longitudinal direction of the wiper strip 12 onto the spring rails 24, the angle pieces 38 sliding into the slots 28. In the process, lower limbs 40 of the angle pieces 38 grip the spring rails 24 from below on the side facing the wiper lip 14. During installation, the tab 42 together with the claws 44 thereof is initially still bent upward. At the end of the installation, said tab is pressed against the back strip 22, the claws 44 penetrating the back strip 22. The spring rails 24 are therefore fixed relative to the wiper strip 12.

The bridge 32 keeps the spring rails 24 at a predetermined distance such that the spring rails 24 can move in the longitudinal grooves 20 with little friction in order to be able to be better matched to the curvatures of a vehicle window. When the spring rails 24 are fitted together with the bridge 32, the spoiler 48 is placed onto the spring rails 24 and the end cap 50 is finally pushed onto the spring rails 24 in the installation direction 46. The end cap 50 latches to a latching hook (not visible), either on an end surface 72 of the bridges 32, 54, 62, 76, which end surface faces the center of the wiper blade 10, or on cutouts 26 on the outer longitudinal edges of the spring rails 24. The outer end wall of the end cap 50 has a cutout 52 for the head strip 18 of the wiper strip 12 which, in the fitted state, ends flush with the outer contour of the end cap 50.

Figure 2:
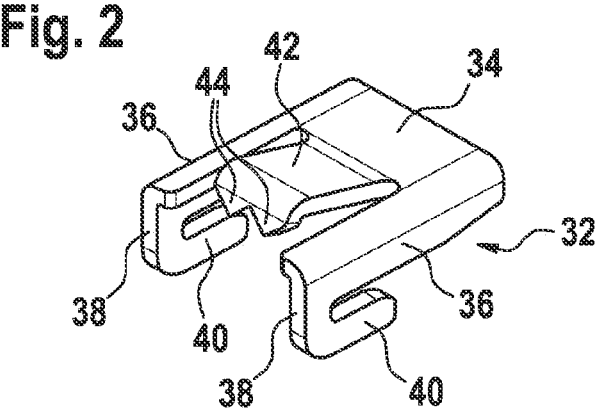
FIG. 2 shows an enlarged perspective view of a bridge according to FIG. 1.
Figure 3:
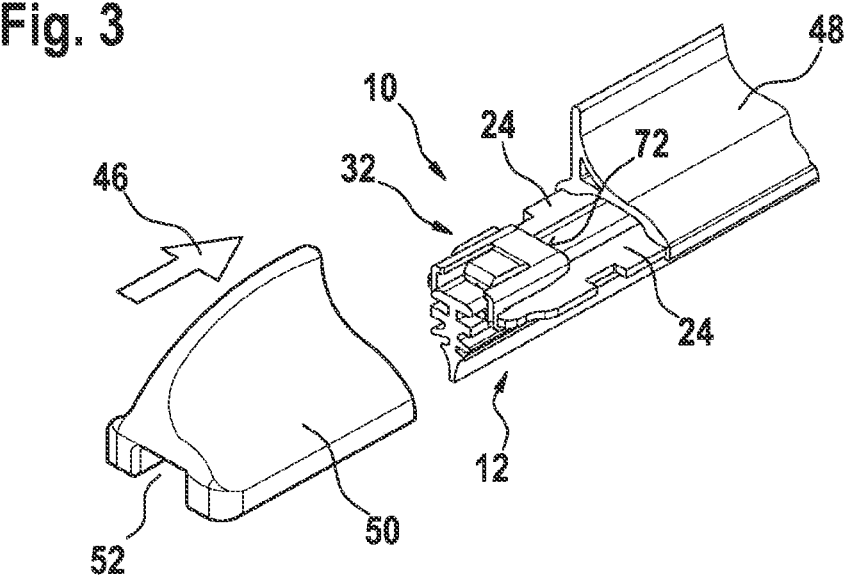
FIG. 3 shows a perspective partial view of a wiper blade with a spoiler and an end cap during installation.
Figure 4:
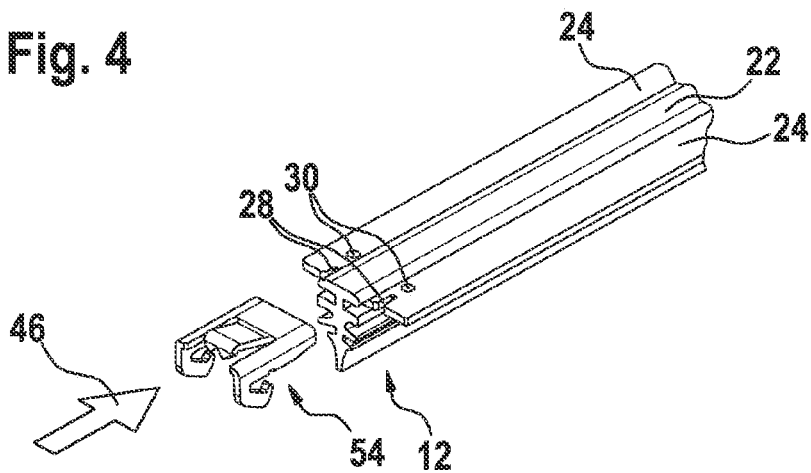
FIG. 4 shows a variant of FIG. 1.
Figure 5:
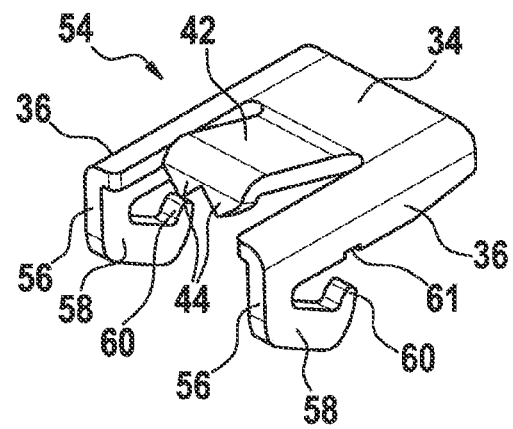
FIG. 5 shows an enlarged perspective view of a bridge according to FIG. 4.

The bridge 54 as per the exemplary embodiment according to FIG. 5 differs from the bridge 32 according to FIG. 2 by the angle pieces 56 on the side parts 36. The angle pieces 56 have lower limbs 58, the free ends of which have hooks 60 which are angled toward the side parts 36. During installation, the lower limbs 58 are bent up a little such that the bridge 32 can slide onto the spring rail 24 and the angle pieces 56 can slide into the slots 28. If the bridge 32 has reached the final position thereof, the lower limbs 58 are pressed against the side parts 36, the hooks 60 engaging in bores 30 in the spring rails 24. In this case, it is expedient for the hooks 60 to enter into cutouts 61 on the opposite side of the side parts 36, thus resulting in a secure, stable form-fitting connection.

Figure 6:
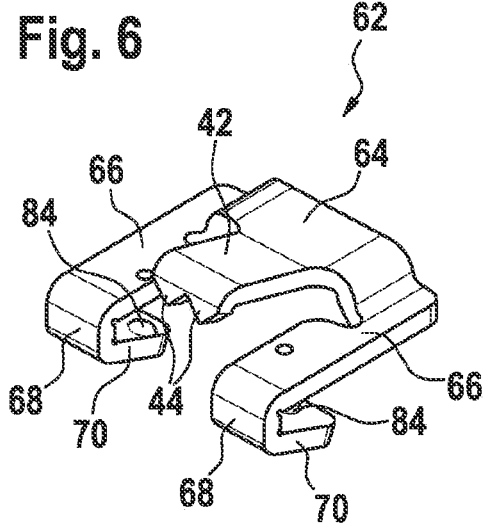
FIG. 6 shows a variant of FIG. 5.

The bridge 62 as per the exemplary embodiment according to FIG. 6 differs from the bridge 54 according to FIG. 5 in that the central part 64 thereof runs with an offset in relation to the side parts 66 such that the flat sides of the side parts 66 run parallel to the spring rails 24. It is therefore not possible for the angle pieces 68, which are integrally formed on the ends, to engage in the slots 28 of the spring rails. On the contrary, said angle pieces enclose the spring rails 24 from the end sides, the lower limbs 70 of the angle pieces 68 gripping the spring rails 24 from below and, in the fitted state, engaging with bumps 84 in the bores 30 of the spring rails 24. In this case, it is possible for the bumps 84 to be located on the lower limbs 70 and/or on the side parts 66.

Figure 8A:
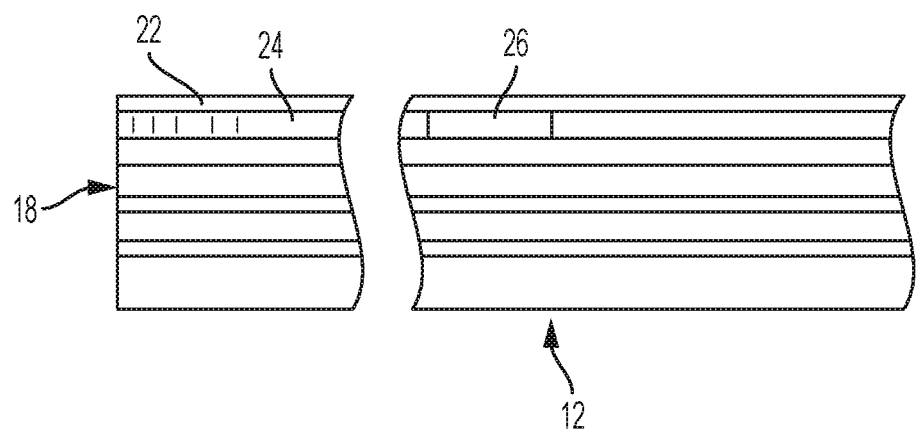
FIG. 8A shows a side view of a portion of the variant according to FIG. 8.

In the exemplary embodiment according to FIGS. 8 and 9, the bridge 76 has a central part 78, with respect to which the side parts 80 run with an offset and are supported on the upper sides of the spring rails 24. The side parts 80 are adjoined by claws 82 which are bent up during installation such that they can be pushed in the installation direction 46 over the spring rails 24. Bumps 84 which fit into the bores 30 in the spring rails 24 are located on those sides of the side parts 80 which face the spring rails 24. Said bumps are inserted in the installation direction 74 transverse to the spring rails 24 into the bores 30, whereupon the claws 82 are pressed against the lower sides of the spring rails 24 such that the bridge 76 is fixed in the longitudinal direction in relation to the spring rails 24 and at the same time keeps the latter at a distance. As in the preceding exemplary embodiment according to FIG. 6, the bumps 84 may be arranged on the side parts 80 and/or the claws 82.

FIGS. 10 to 12 show a joining element 86, the longitudinal web 88 of which bears a bearing spindle 90. The longitudinal webs 88 are adjoined via a central part 94 having side parts 92 by claws 96, the lower limbs of which 98 enclose the spring rails 24 from below in the fitted state. During installation, the lower limbs 98 can enclose an acute angle or an obtuse angle with the side parts 92. In the case of an acute angle, the joining element 86 is pushed in the installation direction 46 in the longitudinal direction of the spring rails 24 onto the latter as far as depressions or cutouts 102 approximately in the central region of the spring rails 24. Bumps 100 which are located on the inner sides of the side parts 92 and/or of the limbs 98 engage in said depressions or cutouts.

If the lower limbs 98 form an angle of equal to or greater than 90 degrees with the side parts 92, the joining element 86 can be fitted in an installation direction 74 transverse to the longitudinal direction of the spring rails 24, in which case the lower limbs 98 are bent at the end of installation around the outer longitudinal sides of the spring rails 24 (FIG. 12).

What is claimed is:

1. A wiper blade (10) with a wiper strip (12), into lateral longitudinal grooves (20) of which two spring rails (24) are inserted as a resiliently elastic supporting element, wherein ends of the spring rails (24) are connected to each other by a bridge (32, 54, 62, 76), the bridge including a substantially flat and external central part (34, 64, 78) that spans a back strip (22) of the wiper strip (12) and includes side parts (36, 66, 80) offset from the central part (34, 64, 78) and being supported on upper sides of the spring rails (24), the back strip (22) upwardly bounding the longitudinal grooves (20), characterized in that the side parts (80) of the bridge (62) extend parallel to the spring rails (24) and, on longitudinal sides thereof, have claws (82) which engage around outer longitudinal sides of the spring rails (24), and, in a region of the claws (82), bumps (84) which engage in bores (30) in the spring rails (24) are provided on those sides of the side parts (80) and/or of the claws (82) which face the spring rails (24), and characterized in that outer longitudinal sides of the spring rails (24) have, on that side of the bridge (32, 54, 62, 76) which is located toward the center of the wiper blade (10), cutouts (26) to which end caps (50) latch in a fitted state.

2. The wiper blade (10) as claimed in claim 1, with a joining element (86) for the articulated connection of the wiper blade (10) to a wiper arm, characterized in that the joining element (86) has lateral claws (96) which, in a fitted state, grip by means of lower limbs (98) thereof, the spring rails (24) from below from outer longitudinal sides thereof, and bumps (100) on those sides of the lower limbs (98) and/or of the side parts (92) of the joining element (86) which face the spring rails (24) engage in depressions or cutouts (102).

3. The wiper blade (10) as claimed in claim 2, characterized in that the central part (34, 64, 78) of the bridge (32, 54, 62, 76) has a tab (42) which, at a free end thereof, has at least one claw (44) which, in a fitted state, penetrates the back strip (22), the tab (42) facing ends of the spring rails (24) and extending between the side parts (36) of the bridge (32, 54).

4. The wiper blade (10) as claimed in claim 1, with a joining element (86) for the articulated connection of the wiper blade (10) to a wiper arm, characterized in that the joining element (86) has lateral claws (96) which, in a fitted state, grip by means of lower limbs (98) thereof, the spring rails (24) from below from outer longitudinal sides thereof, and bumps (100) on those sides of the lower limbs (98) and/or of the side parts (92) of the joining element (86) which face the spring rails (24) engage in depressions or cutouts (102).

5. The wiper blade (10) as claimed in claim 1, characterized in that the central part (34, 64, 78) of the bridge (32, 54, 62, 76) has a tab (42) which, at a free end thereof, has at least one claw (44) which, in a fitted state, penetrates the back strip (22), the tab (42) facing ends of the spring rails (24) and extending between the side parts (36) of the bridge (32, 54).

6. The wiper blade (10) as claimed in claim 1, characterized in that the back strip (22) is raised relative to the spring rails (24).

7. The wiper blade (10) as claimed in claim 1, characterized in that the central part (34, 64, 78) is raised relative to the side parts (36, 66, 80) in proportion to an amount that the back strip (22) is raised relative to the spring rails (24).

8. A wiper blade (10) with a wiper strip (12), into lateral longitudinal grooves (20) of which two spring rails (24) are inserted as a resiliently elastic supporting element, wherein ends of the spring rails (24) are connected to each other by a bridge (32, 54, 62, 76) by side parts (36, 66, 80) of the bridge (32, 54, 62, 76) being supported on upper sides of the spring rails (24) and engaging in cutouts in the spring rails (24) while a central part (34, 64, 78) of the bridge (32, 54, 62, 76) spans a back strip (22) of the wiper strip (12), the back strip upwardly bounding the longitudinal grooves (20), characterized in that the side parts (80) of the bridge (62) run with the wide sides thereof parallel to the spring rails (24) and, on longitudinal sides thereof, have claws (82) which engage around outer longitudinal sides of the spring rails (24), and, in a region of the claws (82), bumps (84) which engage in bores (30) in the spring rails (24) are provided on those sides of the side parts (80) and/or of the claws (82) which face the spring rails (24), and characterized in that outer longitudinal sides of the spring rails (24) have, on that side of the bridge (32, 54, 62, 76) which is located toward the center of the wiper blade (10), cutouts (26) to which end caps (50) latch in a fitted state.

9. The wiper blade (10) as claimed in claim 8, with a joining element (86) for the articulated connection of the wiper blade (10) to a wiper arm, characterized in that the joining element (86) has lateral claws (96) which, in a fitted state, grip by means of lower limbs (98) thereof, the spring rails (24) from below from outer longitudinal sides thereof, and bumps (100) on those sides of the lower limbs (98) and/or of the side parts (92) of the joining element (86) which face the spring rails (24) engage in depressions or cutouts (102).

10. The wiper blade (10) as claimed in claim 9, characterized in that the central part (34, 64, 78) of the bridge (32, 54, 62, 76) has a tab (42) which, at a free end thereof, has at least one claw (44) which, in a fitted state, penetrates the back strip (22), the tab (42) facing ends of the spring rails (24) and extending between the side parts (36) of the bridge (32, 54).

* * * * *